3,402,204
PROCESS FOR THE PRODUCTION OF
DIARYL SULFONES
Charles W. Plummer, Beverly, and Milton R. Radcliffe, Marblehead, Mass., assignors to United Shoe Machinery Corporation, Boston, Mass., a corporation of New Jersey
No Drawing. Filed Dec. 2, 1964, Ser. No. 415,456
9 Claims. (Cl. 260—607)

ABSTRACT OF THE DISCLOSURE

A process of producing diaryl sulfones by reacting an aryl sulfonyl chloride with an aryl compound in nonaqueous liquid medium containing a catalytic amount of zinc chloride.

---

The present invention is directed to the manufacture of diaryl sulfones.

For some time it has been known to produce a diaryl sulfone by reacting an aryl sulfonyl chloride with an aryl hydrocarbon in the presence of a Friedel-Crafts catalyst. Friedel-Crafts catalyst include $AlCl_3$ and $FeCl_3$, with various other compounds such as $TiCl_4$, $SnCl_4$, $ZnCl_2$ and $BF_3$ being at times considered as capable of similar catalytic activity. Of these $AlCl_3$ is the catalyst most generally recommended, possibly, for the reason that it exhibits the strongest catalytic activity. To return then, in general it may be said of the reaction, that it has not been entirely accepted, particularly in the form in which it has been initially proposed; that for the reason that the reaction requires use of an equimolar amount of catalyst in order to obtain an acceptable product yield. By "equimolar" is meant that one mol of catalyst is used per mol of aryl sulfonyl chloride present in the reaction. This is a relatively large amount of catalyst and its use often gives rise to the necessity to extract, by later treatment, the catalyst residue from the diaryl sulfone product. In addition, and, also a serious consideration is that such a large amount of catalyst may initiate reactions producing in turn unwanted side products. To state it differently, the reaction lacks desirable controllability. A common occurrence of this latter nature is the rearrangement of alkyl substituted aromatic radicals which takes place in such a reaction, see for example, J. Org. Chem. 29(8) 2310-12 (1964).

More recently the Friedel-Crafts process has been the subject of improvement. As a result it may be carried out using less than equimolar amounts of catalyst, provided, however, that the catalyst is limited to $FeCl_3$, see U.S. 2,224,964, and $AlCl_3$, see U.S. 2,781,402. Both of these catalysts may be considered either as the traditional Friedel-Crafts catalyst, or in the wider scope indicated previously, as those compounds which exhibit the strongest catalytic activity. The latter has reference to the earlier statement that compounds other than the traditional Friedel-Crafts catalysts have been at times considered capable of similar catalytic activity. Because of the high catalytic strength of $AClC_3$ and $FeCl_3$, however, the improved process too may be considered as providing less than desirable controllability as well as failing to give consistently high product yields.

It is an object of this invention to provide an improved process by which to produce diaryl sulfones in which an aryl sulfonyl chloride is reacted with an aryl compound in the presence of less than equimolar amounts of catalyst.

It is another object of this invention to provide an improved process for producing diaryl sulfones as described, in which high controllability may be achieved.

It is another object of this invention to provide an improved process as described by which diaryl sulfones are produced in consistently high yield.

These and other objects of the invention are attained in a process for producing diaryl sulfones having the formula $$R\text{—}SO_2\text{—}R_1$$

wherein R and $R_1$ are like or unlike aryl radicals consisting of aryl hydrocarbon radicals which include alkyl-substituted and aryl-substituted aryl radicals, and alkoxy-, aryloxy-, and halo-substituted aryl hydrocarbon radicals. The featured process involves reacting an aryl sulfonyl chloride of the formula $$R\text{—}SO_2\text{—}Cl$$

with the aryl compound of the formula $$R_1\text{—}H$$

wherein R and $R_1$ are aryl radicals consisting of aryl hydrocarbon radicals which include alkyl-substituted and aryl-substituted aryl radicals, and alkoxy-, aryloxy-, and halo-substituted aryl hydrocarbon radicals. The reaction to be used is carried out in a nonaqueous liquid medium in which a zinc chloride catalyst is present in the amount of greater than about 0.001 part by weight based on the amount of the aryl sulfonyl chloride and at a temperature ranging about 90° C. to about 160° C.

As indicated previously, the diaryl sulfones produced by the process of this invention include those in which the aryl radicals are aryl hydrocarbon radicals, which may include alkyl- and aryl-substituents, and alkoxy-, aryloxy-, and halo-substituted aryl hydrocarbon radicals. Illustrative of these are aryl hydrocarbon radicals such as the phenyl, tolyl, biphenyl, acenaphthyl, naphthyl and anthryl radicals. The substituted aryl hydrocarbon radicals intended may be illustrated by the same radicals but which contain alkoxy-, aryloxy-, and halo-substituents.

The aryl radicals of the diaryl sulfone products produced may be like or unlike in a given diaryl sulfone. For instance a diaryl sulfone having like radicals may be illustrated by ditolyl sulfone while those having unlike radicals may be illustrated by tolyl naphthyl sulfone. Illustrative diaryl sulfones available from practice of the featured process include in addition to the two above, tolyl phenyl sulfones, phenyl naphthyl sulfones, dinaphthyl sulfones, di(biphenyl) sulfones, phenyl biphenyl sulfones, methoxy phenyl sulfones, phenyl(ethyl) phenyl sulfones, di(ethyl)phenyl sulfones, xylyl methoxy tolyl sulfones, phenyl cymene sulfones, phenoxyethyl phenyl sulfones, phenoxyphenyl phenyl sulfones, diacenaphthyl sulfones, dianthryl sulfones, tolyl anthryl sulfones, chlorophenyl phenyl sulfones, di(chloro) phenyl sulfones, etc. The identity of the aryl radicals contained in the diaryl sulfone is determined or consistent with the aryl radicals contained in the aryl sulfonyl chloride and aryl compound starting materials.

The starting materials for use in the improved process of this invention include an aryl sulfonyl chloride and an aryl compound which may be an aryl hydrocarbon, or substituted aryl hydrocarbon. The aryl radicals contained in the aryl sulfonyl chloride and the aryl compound may be like or unlike with respect one to the other. To illustrate, tolyl sulfonyl chloride may be reacted with toluene to produce ditolyl sulfone, or tolyl sulfonyl chloride may be reacted with naphthalene to produce tolyl naphthyl sulfone. In addition mixtures of each of the aryl sulfonyl chloride and the aryl compound may be used in a given reaction to give a reaction product made up of a mixture of sulfones. The aryl sulfonyl chloride and aryl compound starting materials may be used in substantially equimolar proportions, but it is preferred to use an excess of the aryl compound starting material for reasons to be discussed below.

The reaction between the aryl sulfonyl chloride and the aryl compound starting material is carried out in a nonaqueous liquid medium. This medium may be provided by the reactants themselves if they are liquid or liquify at the reaction temperatures used. This accounts for the preference indicated above, that an excess of the aryl compound starting material be used. If, however, the aryl compound starting material is such that it is difficult to separate from the reaction product it is recommended that the excess be kept to an operating minimum. Otherwise, if reaction conditions dictate, certain nonreactive solvents or diluents nonaqueous in nature, may be used, such as organic solvents having high boiling points, illustrated by ethylene dichloride, nitrobenzene, o-dichlorobenzene, carbon tetrachloride, cyclohexane, etc.

The recommendation that if organic solvents or diluents be used to facilitate provision of a nonaqueous liquid reaction medium that they be high boilers is reflective of the reaction temperatures involved in the process of this invention. These may range on the order of about 90° C. to 160° C. Variations in this range may be practiced and in doing so will depend somewhat on the identity of the reactant starting materials, particularly the specific aryl sulfonyl chloride involved. Aryl sulfonyl chlorides are prone to break down at elevated temperatures in the presence of the catalyst, and accordingly it is desirable to run the reaction at as low a temperature as is possible. While variations may be practiced with respect to pressure conditions, the reaction is accompanied by the evolution of hydrogen chloride, and refluxing is a preferred reaction condition.

The process of this invention features a catalytic reaction in which a catalytic amount, as distinguished from equimolar amounts, of a specific catalyst, to wit: zinc chloride is used. It is a surprising aspect of this invention that this catalyst, zinc chloride, which may be described as a mild catalyst, facilitates the recovery of consistently high yields of diaryl sulfone, to wit: reaction yields ranging consistently 92–98% and even higher. Catalytic amounts of the zinc chloride catalyst, that is amounts as low as about 0.001 part by weight based on the weight of aryl sulfonyl chloride present in the reaction may be used to obtain consistently high product yields. While the amount of zinc chloride catalyst may be increased over that amount it has been found that no advantage is obtained by increasing the amount to over about 0.05 part by weight based on the weight of aryl sulfonyl chloride present. Reactivity is not increased over that higher amount and its use in larger amounts could lead to difficulty, for instance it could require removal of catalyst from the yield product. A preferred range for the zinc chloride catalyst may be set at 0.005 to 0.020 part by weight based on the weight of aryl sulfonyl chloride present in the reaction. In order to maintain the nonaqueous nature of the liquid medium it may be recommended as preferred practice at least that the zinc chloride used as a catalyst be dried or anhydrous in nature.

The following examples are provided for the purpose of further illustrating the invention.

Example I.—Preparation of xylyl tolyl sulfone

The following materials are charged to a flask fitted with a reflux condenser, thermometer, and stirrer:

|  | G. |
|---|---|
| Xylene sulfonyl chloride (mixed isomers) (1 mole) | 205 |
| Toluene (commercial) (1.5 moles) | 138 |
| ZnCl₂ (anhyd.) | 2 |

Heat is applied with stirring and the mixture refluxed gently at 125° C.–140° C. pot temperature, for 20 hours. About 30 minutes after start of heating in the indicated range, hydrogen chloride evolution begins and continues for the 20 hours. At that point saponification equivalent determination carried out on a sample of reaction mixture shows that only 4 percent of the sulfonyl chloride remained unreacted.

The reaction product is filtered hot through Celite filter-aid and is washed with toluene. The combined filtrates are stripped of excess toluene under reduced pressure and the crude product distilled under vacuum of 0.05 to 0.08 mm. at 190° C.–217° C. The xylyl tolyl sulfone distillate obtained is a mixture of various isomeric xylyl tolyl sulfones. The product weighs 242 g., corresponding to 94 percent yield based on sulfonyl chloride. In appearance the distillate is a viscous, pale orange liquid which partially crystallizes after standing several days.

Example II.—Preparation of xylyl naphthyl sulfone

The following materials are charged into a reaction flask fitted with a reflux condenser, thermometer, and stirrer:

|  | G. |
|---|---|
| Naphthalene (M.P. 80.2°) (15 moles) | 1920 |
| ZnCl₂ (anhydrous) | 15.2 |

The contents of the reaction vessel are melted by heating to 125° and 3060 g. (15 moles), of xylene sulfonyl chloride (mixed isomers) are then added with stirring over eight hours. During the addition the temperature is maintained at 130° C.–135° C. Hydrogen chloride evolution takes place beginning practically at the start of the sulfonyl chloride addition. After the first hour, 150 ml. of cyclohexane are added as a single charge to the vessel to provide a gentle refluxing in the condenser. This serves to prevent clogging caused by naphthalene deposition. After the addition of the sulfonyl chloride is completed, a saponification equivalent determination shows reaction about 91 percent complete. The reaction mixture is then stirred with heating at 135° C. for about four additional hours at which time saponification equivalent determination shows reaction is 97 percent complete.

To remove excess sulfonyl chloride and naphthalene, the reaction product is dumped into a solution of 85 g. NaOH in 400 ml. of water and agitated at 80° C.–85° C. for three hours, while passing live steam into the mixture. The dark mixture then obtained is poured into a stirred mixture of 4 liters of water acidified with concentrated hydrochloric acid and 3.3 liters CHCl₃. After about five minutes, the lower layer which is formed is separated. This is similarly washed with another 4 liters water, and the lower layer which is then formed is separated out. This is treated by stirring 20 minutes with 200 g. Na₂SO₄ and 50 g. activated charcoal, followed by filtering by suction to remove charcoal and residual salts.

The filtrate obtained is distilled under reduced pressure to remove CHCl₃ and final traces of water. The brown viscous xylyl naphthyl sulfone then obtained weighs 4254 g., or 96 percent yield, based on both xylene sulfonyl chloride and naphthalene. The xylyl naphthyl sulfone obtained is an isomeric mixture.

Example III.—Preparation of di(tolyl) sulfone

The following materials are charged into a reaction flask fitted with a reflux condenser, thermometer, stirrer and addition funnel:

| p-Toluene sulfonyl chloride (commercial) (6.9 moles) | g | 1315 |
|---|---|---|
| Toluene (commercial) (3.75 moles) | ml | 400 |
| ZnCl₂ (anhydrous) | g | 26 |

The reaction mixture is heated with stirring to 135° C. to obtain gentle refluxing conditions. As the reaction proceeds, toluene is consumed; and, in order to maintain reflux temperatures of 135°±5° C., 800 ml. additional toluene (7.50 moles) is gradually added to the reaction over a six-hour period. Hydrogen chloride is evolved strongly during this entire period. A saponification equivalent determination establishes a 97% reaction completion.

Part of the excess toluene is then distilled off over a one hour period in order to finish the reaction at 140° C. Most of the excess toluene then remaining is distilled off at atmospheric pressure, and, finally distillation is carried out at reduced pressure to drive off the toluene that then remains. The pot temperature is kept at 160–165° C. to prevent crystallization of the sulfone product.

The crude, molten ditolyl sulfone product is poured into a stirred hot water solution containing 200 ml. concentrated hydrochloric acid. This serves to hydrolyze any unreacted sulfonyl chloride, and to solubilize zinc salts. The resulting slurry of crystallized ditolyl sulfone is filtered off by suction, and is again washed with hot water, and filtered.

After heating in open trays at 110° C. to remove water, 1615 g. of di(tolyl) sulfone is obtained which is a mixture of various isomeric di(tolyl) sulfones. Percent yield is 95 percent, based on toluene sulfonyl chloride.

Example IV.—Preparation of tolyl naphthyl sulfone

The following materials are charged into a flask fitted with a reflux condenser, thermometer, and stirrer:

p-Toluene sulfonyl chloride (commercial) (30 moles) _____ g__ 5715
Naphthalene (30 moles) _____ g__ 3840
Ethylene dichloride _____ ml__ 175
$ZnCl_2$ (anhydrous) _____ g__ 28

The reactants are heated to provide them in molten condition. Stirring is started and the temperature is raised to 125 to 135° C. to arrive at refluxing conditions.

After eight hours, during which period hydrogen chloride is strongly evolved, the reaction is 97 percent complete according to a saponification equivalent determination. Ethylene dichloride excess is removed by reduced pressure distillation. The reaction product is removed from the flask and allowed to cool. On cooling it obtains as a brown amorphous solid.

The reaction product is ball-milled for 20 hours with a solution of 500 ml. concentrated $NH_4OH$ in nine liters of water. The slurry obtained is filtered and washed three times with water containing, successively 200 ml., 100 ml., and 50 ml. of concentrated $NH_4OH$. The filtered product is placed in trays and heated overnight in an oven at 120° C. to remove moisture and traces of naphthalene. The product obtained, which is p-toluene naphthalene sulfone is in 95 percent yield based on both the sulfonyl chloride and naphthalene; melting point for the product is 94–102° C. established after the product has been allowed to crystatllize slowly over a period of several days.

Example V.—Preparation of the xylene phenoxy phenyl sulfone

The following are charged into a flask fitted with a reflux condenser, stirrer and thermometer:

G.
Xylene sulfonyl chloride (1 mole) _____ 205
Phenoxy benzene (1.2 moles) _____ 204
$ZnCl_2$ (anhydrous) _____ 1.0

Heating is carried out at 145–150° C. with stirring, for four hours, during which period a strong evolution of hydrogen chloride takes place. At the end of that period, the reaction is 96 percent complete as determined by saponification equivalent determination.

The reaction product is stirred with a hot solution of excess NaOH; following that with hot aqueous HCl, and finally with hot water. Last traces of water are removed by azeotropic distillation with added xylene.

Excess phenoxy benzene and xylene are removed from the reaction mixture by vacuum distillation, and final traces of phenoxy benzene are removed by passing live steam into the stirred product. The product then obtained is dried at 110° C. overnight in open trays, to give 325 g. or 95.5 percent yield of xylene phenoxy phenyl sulfone which is orange in color and viscous in constituency.

Example VI.—Preparation of methoxy phenyl xylyl sulfone

The following materials are charged into a flask fitted with reflux condenser, stirrer, and thermometer:

G.
Xylene sulfonyl chloride (mixed isomers) (1 mole) _____ 205
Methoxy benzene (B.P. 153–154°) (1.2 moles) ___ 130
$ZnCl_2$ (anhydrous) _____ 1.0

With stirring, the reaction mixture is heated at 100 to 115° C. for a six hour period. During this period 92 percent of the theoretical hydrogen chloride is evolved. A saponification equivalent determination on the reaction mixture shows a 93 percent reaction completion.

Steam distillation of the reaction mixture is carried out to convert unchanged xylene sulfonyl chloride to water soluble products, and remove excess methoxy benzene. The reaction mixture is then taken up in hot chloroform, washed with water, then dilute hydrochloric acid, dilute sodium hydroxide, and finally with water. The choloroform and some water are removed by distillation and finally at reduced pressure.

To remove last traces of volatiles the product is heated overnight in an open dish at 110° C. The yield then is 242 g. of pale yellow, odorless liquid methoxy diphenyl sulfone, consisting of mixed isomers. On prolonged standing, this product partially crystallizes.

Example VII.—Preparation of bis-(chlorophenyl) sulfone

The following materials are charged into a flask fitted with a reflux condenser, stirrer, and thermometer:

G.
Chlorobenzene sulfonyl chloride (mixed isomers) (1 mole) _____ 212
Chlorobenzene (1.5 moles) _____ 170
$ZnCl_2$ (anhydrous) _____ 4

The reaction mixture is heated at 140–150° C. with gentle refluxing and stirring for about 12 hours. During this period hydrogen chloride is strongly evolved. At the end of the 12 hour period, the reaction is 95 percent complete as indicated by saponification equivalent determination.

Excess chlorobenzene is distilled off the product using reduced pressure and bis-(chlorophenyl) sulfone is crystallized from alcohol to give a yield of about 93 percent of mixed isomers of bis(chlorophenyl) sulfone; having M.P., 135–145° C.

The diaryl sulfones produced by this invention have a number of uses, including those of plasticizers for various synthetic polymeric materials and intermediates from which to produce biologically active materials, dyestuffs, etc.

It will thus be seen that the objects set forth above are efficiently attained and since certain changes may be made in carrying out the above process without departing from the scope of the invention, it is intended that all matter contained in the above description shall be interpreted as illustrative and not in a limiting sense.

Having thus described our invention, what we claim as new and desire to secure by Letters Patent of the United States is:

1. In a process for producing diaryl sulfones through reaction of an aryl sulfonyl chloride of the formula:

with an aryl compound of the formula:

where R and $R_1$ are selected from the class consisting of aryl hydrocarbon radicals and alkoxy-, aryloxy-, and halo-substituted aryl hydrocarbon radicals, the improvement which comprises carrying out the reaction in a nonaqueous liquid medium in which zinc cholirde is present in the amount of between about 0.001 and about 0.05 part by wight based on the amount of the aryl sulfonyl chloride present and at a temperature ranging about 90° C. to about 160° C.

2. The process according to claim 1 wherein the zinc chloride is present in the amount of about 0.005 to about 0.02 based on the amount of the aryl sulfonyl chloride present.

3. In a process for producing ditolyl sulfone through reaction of tolyl sulfonyl chloride with toluene the improvement which comprises carrying out the reaction in a nonaqueous liquid medium in which zinc chloride is present in the amount of between about 0.001 and about 0.05 part by weight based on the amount of the tolyl sulfonyl chloride and at a temperautre ranging about 90° C. to about 160° C.

4. In a process for producing tolyl naphthyl sulfone through reaction of tolyl sulfonyl chloride with naphthalene, the improvement which comprises carrying out the reaction in a nonaqueous liquid medium in which zinc chloride is present in the amount of between about 0.001 and about 0.05 part by weight based on the amount of the tolyl sulfonyl chloride and at a temperature ranging about 90° C. to about 160° C.

5. In a process for producing xylyl tolyl sulfone through reaction of xylyl sulfonyl chloride with toluene, the improvement which comprises carrying out the reaction in a nonaqueous liquid medium in which zinc chloride is present in the amount of between about 0.001 and about 0.05 part by weight based on the amount of the xylyl sulfonyl chloride and at a temperature ranging about 90° C. to about 160° C.

6. In a process for producing xylyl naphthyl sulfone through reaction of xylyl sulfonyl chloride with napthalene, the improvement which comprises carrying out the reaction in a nonaqueous liquid medium in which zinc chloride is present in the amount of between about 0.001 and about 0.05 part by weight based on the weight of the xylyl sulfonyl chloride and at a temperature ranging about 90° C. to about 160° C.

7. In a process for producing xylyl phenoxy phenyl sulfone through reaction of xylyl sulfonyl chloride with phenoxy benezene, the improvement which comprises carrying out the reaction in a nonaqueous liquid medium in which zinc chloride is present in an amount of between about 0.001 and about 0.05 part by weight based on the weight of the xylyl sulfonyl chloride and at a temperature ranging about 90° C. to about 160° C.

8. In a process for producing methoxy phenyl xylyl sulfone through reaction of xylyl sulfonyl chloride with methoxy benzene, the improvement which comprises carrying out the reaction in a nonaqueous liquid medium in which zinc chloride is present in an amount of between about 0.001 and about 0.05 part by weight based on the weight of the xylyl sulfonyl chloride and at a temperature ranging about 90° C. to about 160° C.

9. In a process for producing bis(chlorophenyl) sulfone through reaction of chlorophenyl sulfonyl chloride with chlorobenzene, the improvement which comprises carrying out the reaction in a nonaqueous liquid medium in which zinc chloride is present in an amout between about 0.001 and about 0.05 parts by weight based on the weight of the chlorophenyl sulfonyl chloride and at a temperature ranging about 90° C. to about 160° C.

References Cited

Chrustschoff: Berichte, vol. 7, pp. 1167–1168 (1874).

Burton et al.: J. Chem. Soc. (London) (1945), pp. 14–18.

Courtot et al.: "Compt. Ren.," vol. 218, pp. 973–975 (1944).

CHARLES B. PARKER, *Primary Examiner.*

D. R. PHILLIPS, *Assistant Examiner.*